United States Patent Office.

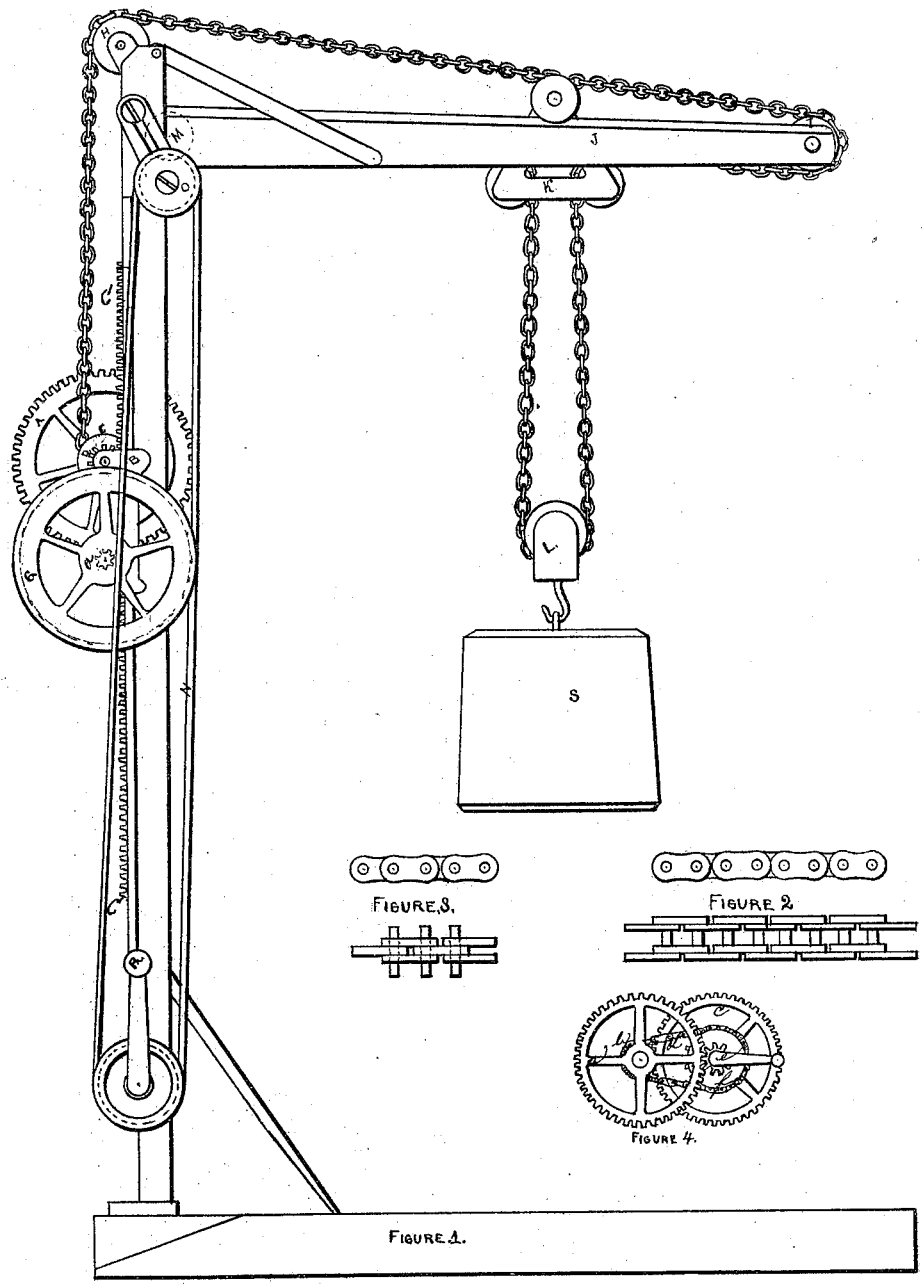

ENOCH OSGOOD, OF BOSTON, MASSACHUSETTS.

Letters Patent No. 97,223, dated November 23, 1869.

IMPROVEMENT IN HOISTING-APPARATUS AND DERRICKS.

The Schedule referred to in these Letters Patent and making part of the same.

*To all whom it may concern:*

Be it known that I, ENOCH OSGOOD, of Boston, county of Suffolk, and State of Massachusetts, have invented a new and useful Improvement in a Derrick for Hoisting, and for other purposes; and that the following is a full, clear, and exact description of the same, reference being had to the accompanying drawings, and letters of reference marked thereon, in which—

Figure 1 is a side elevation.
Figures 2 and 3, prog-chain.
Figure 4 shows the travelling-gears on a circle.

In describing the nature, use, and operation, as well as the construction of my invention, I proceed with the use of the same gears and pinions that are used in common derricks; but instead of using the gears and pinions stationary, and revolving them on their centres to wind up the chain or rope, I have them travel over stationary racks, or around stationary gears, as hereinafter named.

To designate the different parts of my invention, they are marked as follows:

The cog-wheel and pinions A *a*, that are on the carriage B, travel over the racks C C, by the action of the pinions D D that are on the ends of the arbor or cylinder E, and gear into the racks C C, which are driven by the speed-wheel G.

The endless chain F, that raises the weight S, passes around the arbor E, and over truck H, on the top, and over another truck, I, that is on the end of arm J, and over and down between two trucks in a travelling-carriage, K, that rests on arm J; also around a sheave in the hook-block L, and over another truck, M, that is between the racks C C.

These travelling-gears draw the endless chain F, and are driven by an endless belt, N, around speed-wheel G, and over truck O, and around the crank-pulley P, and by turning the crank R, the whole is put in motion.

In using the centres of the arbors E for a fulcrum, in winding up the chain F, as in common derricks, you take up just the size of the arbor each revolution, adding one-half the size of the chain to the diameter of the arbor, which diminishes the leverage, and requires more power to hoist the same weight.

In using the pitch-lines of the pinions D D for a fulcrum, so that in their revolutions they travel ahead over the rack C C just their circumference, each revolution, takes up just double the amount of chain, with the same power, as there is no loss by the size of it, as the pressure is equal on both sides of the arbor.

In the one case, the centres being used as a fulcrum, in the other, the pitch-lines of the pinions D D, each being equal distance apart, make the leverage the same, except in the size of the chain F, which makes no difference in the travelling geared derrick, and will hoist just as fast again with the same power.

Run the gears up out of the rack C C, so that they will revolve on their centres, and tie a thread into a link of the chain F, at the end of the arm J, and turn the crank R fifty revolutions, and see how much of the thread is taken up. Then slip it down into the rack C C again, and give fifty more turns. Measure again, and you will find that you have taken up just double the amount of thread by the travelling ahead of the gears.

The shifting-apparatus is very easily applied by passing the endless chain down between the two trucks in the triangular carriage *k*, and around the sheave in the hook-block M, and by pulling either side of the chain, will shift the weight just where it is wanted.

I am aware that there are similar devices for shifting-apparatus in large machine-shops, where there is plenty of room, and horizontal timbers, but I do not know of any being applied to common derricks.

A travelling-derrick may be made of a common one, by spiking a plank on either side of the mast or boom, as desired, and secure the racks C C to their edges, and make a carriage for the same gears, adding the pinions D D to the ends of arbor E; also add the speed-wheel G, truck O, crank-pulley P, and an endless belt, N, and you have it at a small cost.

To make a circular power of it, have a planet-wheel travel around a stationary wheel, to turn the main arbor, by using a prog-chain, or an intermediate gear, attaching the main arbor to the planet-wheel arbor, motion being given by the centre pinion, as shown at fig. 4, and lettered as follows:

Planet-wheel, *a*; its pinions, *b*; stationary wheel, *c*, prog-chain, *d*; crank-pinion, *e*; and main arbor, *f*.

The prog-chain is made of flat links, by using two abreast, and leaving a space between them for the cogs of a wheel to mesh in on the pins, or two, and one link may be used, leaving the pins on the outside of the chain for the cogs, as shown at figs. 2 and 3, the centre of the pins serving as a pitch-line to the gears, and will run equally as well, and can be figured the same as gears, as there is no more friction, loss, or gain.

For mining-purposes, the travelling-gears are superior to any other, as they can be used with a small steam-engine in the most simple and effective manner, which may be done by laying a track of racks, C C, the same as a railroad-track, and attaching the pinions D D to the driving-wheels of the engine, and let it run backward and forward over these racks, either with a double or single chain or rope, or let a double or single chain pass down the shaft of the mine, as desired, facilitating the hoisting, and making it more simple and safe.

Having described my invention,

What I claim, and desire to secure by Letters Patent, is as follows:

1. The travelling of the hoisting-gears over racks, or their equivalent, for the purpose of hoisting or driving machinery, and for other purposes, arranged substantially as and for the purposes herein set forth.

2. The shifting-apparatus to common derrick, substantially as and for the purpose herein set forth.

ENOCH OSGOOD.

Witnesses:
S. A. STROUT,
E. A. CLAPP.